(12) United States Patent
Katsuyama et al.

(10) Patent No.: US 9,167,157 B2
(45) Date of Patent: Oct. 20, 2015

(54) DRIVE APPARATUS

(71) Applicant: PANASONIC CORPORATION, Osaka (JP)

(72) Inventors: Norikazu Katsuyama, Osaka (JP); Hironori Honsho, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/166,785

(22) Filed: Jan. 28, 2014

(65) Prior Publication Data

US 2014/0146226 A1    May 29, 2014

Related U.S. Application Data

(63) Continuation of application No. PCT/JP2013/000226, filed on Jan. 18, 2013.

(30) Foreign Application Priority Data

Jan. 26, 2012  (JP) ................... 2012-013729

(51) Int. Cl.
  *H04N 5/225*  (2006.01)
  *H04N 5/232*  (2006.01)
  *G03B 17/02*  (2006.01)

(52) U.S. Cl.
  CPC ............ *H04N 5/23241* (2013.01); *G03B 17/02* (2013.01); *H04N 5/2257* (2013.01); *G03B 2205/0053* (2013.01); *G03B 2217/007* (2013.01)

(58) Field of Classification Search
  CPC . H04N 5/23241; H04N 5/2257; G03B 17/02; G03B 2217/007; G03B 2205/0053
  USPC .................................................. 348/370–375
  See application file for complete search history.

(56) References Cited

U.S. PATENT DOCUMENTS

2010/0295378 A1    11/2010   Suzuki et al.

FOREIGN PATENT DOCUMENTS

| JP | 08251817   A  * | 9/1996 |
| JP | 09-254838  A   | 9/1997 |
| JP | 2001069388 A   | 3/2001 |
| JP | 2001-155944 A  | 6/2001 |

(Continued)

OTHER PUBLICATIONS

International Search Report issued in International Application No. PCT/JP2013/000226 with Date of mailing Mar. 19, 2013, with English Translation.

*Primary Examiner* — Yogesh Aggarwal

(74) *Attorney, Agent, or Firm* — McDermott Will & Emery LLP

(57) ABSTRACT

An imaging apparatus includes an outer shell, a camera body arranged inside the outer shell and moving along the outer shell, drivers arranged inside the outer shell and configured to drive the camera body, a drive controller configured to control the drivers, a power source arranged inside the outer shell, a power receiver arranged inside the outer shell so as to move together with the camera body and configured to receive power from the outside of the outer shell to supply the power to the power source, and a power supply detector configured to determine whether or not the power is supplied from the outside of the outer shell. When the power is supplied, the drive controller moves the camera body to a predetermined power supply position.

17 Claims, 15 Drawing Sheets

(56) References Cited

FOREIGN PATENT DOCUMENTS

| JP | 2005-311761 A | 11/2005 |
| JP | 2008109762 A | 5/2008 |
| JP | 2008306675 A | 12/2008 |
| JP | 2009-195034 A | 8/2009 |
| JP | 2010-087964 A | 4/2010 |
| JP | 2010-098896 A | 4/2010 |
| JP | 2010-273453 A | 12/2010 |

* cited by examiner

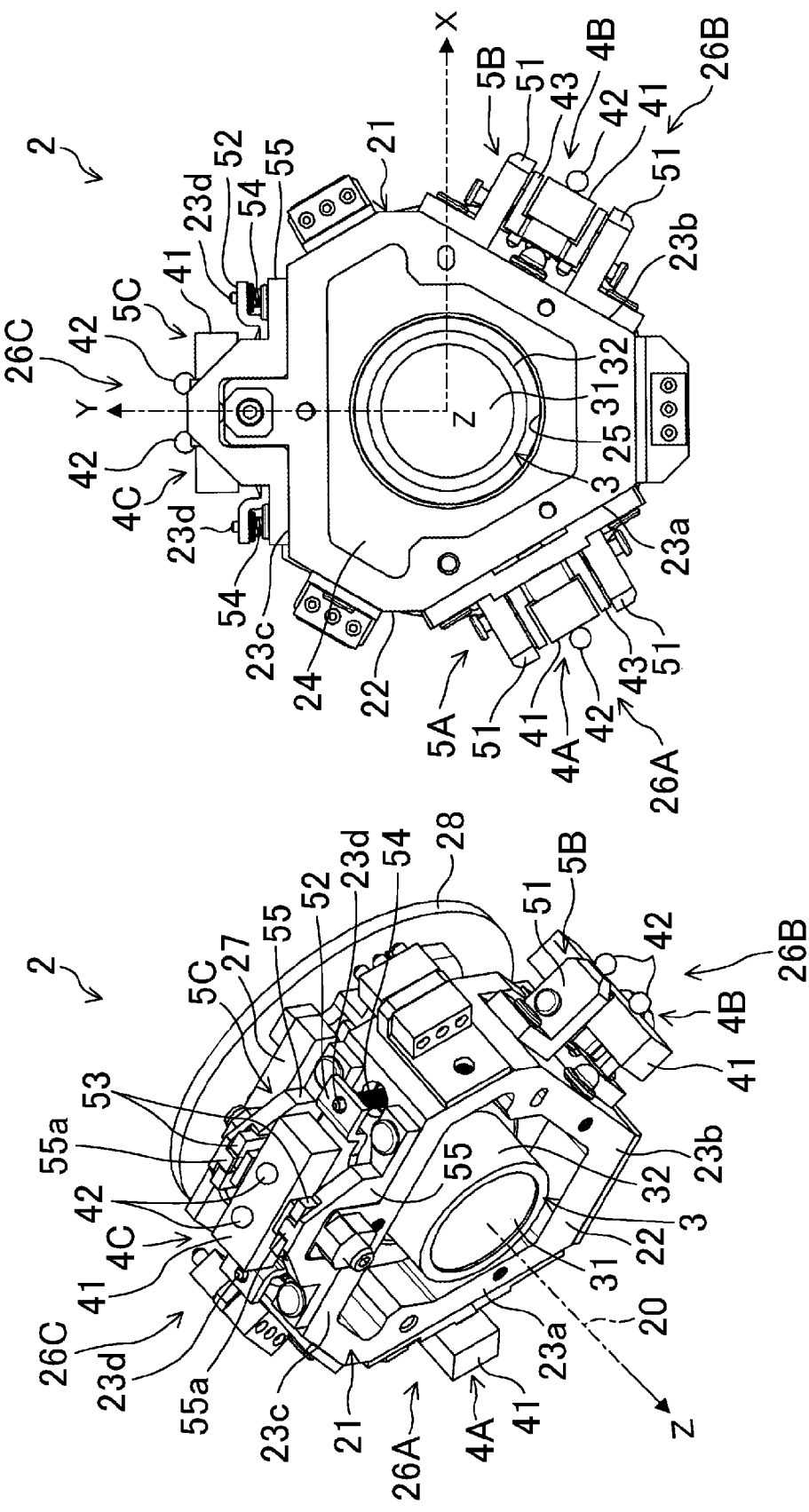

DRIVE APPARATUS

CROSS-REFERENCE TO RELATED APPLICATIONS

This is a continuation of International Application No. PCT/JP2013/000226 filed on Jan. 18, 2013, which claims priority to Japanese Patent Application No. 2012-013729 filed on Jan. 26, 2012. The entire disclosures of these applications are incorporated by reference herein.

BACKGROUND

The technique disclosed herein relates to a drive apparatus including a movable body arranged inside a case.

Japanese Patent Publication No. H09-254838 discloses one example of the drive apparatus. The drive apparatus disclosed in Japanese Patent Publication No. H09-254838 is an imaging apparatus. In such an imaging apparatus, an imager is arranged inside a case having an inner spherical zone surface. The imager includes three drive wheels, and the drive wheels contact an inner surface of a spherical shell. In such a manner that the drive wheels are driven, the imager moves along the inner surface of the spherical shell. The imager shoots, through the spherical shell, an image of an object outside the spherical shell.

SUMMARY

The imaging apparatus disclosed in Japanese Patent Publication No. H09-254838 includes a power source, and the drive wheels are electrically operated. Thus, when power of the power source runs out, it is necessary to charge the power source. However, in order to charge the power source, it is necessary to remove the power source out from the case, and such a charge operation is complicated.

Non-contact charging may be performed by a power transmitter provided outside the case without removing the power source out from the case. In order to charge the power source in a non-contact state, it is necessary that a power receiver configured to receive power from the power transmitter is provided in the case. In the case where the power receiver is provided in the case, the power source is typically provided in the imager in which the drive wheels are provided, and therefore the power receiver is, as in the power source, provided in the imager. Since the power receiver moves together with the imager in the case, the position of the power receiver in the case is not fixed. For such a reason, it is necessary to adjust the positions of the power receiver and the power transmitter upon charging, and, as a result, the charge operation is complicated.

The technique disclosed herein has been made in view of the foregoing, and is directed to facilitate charging of a power source provided in a case.

A drive apparatus disclosed herein includes a case; a movable body arranged inside the case and moving along the case; a driver arranged inside the case and configured to drive the movable body; a controller configured to control the driver; a power source arranged inside the case and configured to supply power to the driver; a power receiver arranged inside the case so as to move together with the movable body and configured to receive power from an outside of the case to supply the power to the power source; and a determinator configured to determine, based on the power received by the power receiver, whether or not the power is supplied from the outside of the case. When the determinator determines that the power is supplied, the controller controls the driver to move the movable body to a predetermined power supply position.

According to the drive apparatus, charging of the power source in the case can be facilitated.

BRIEF DESCRIPTION OF THE DRAWINGS

FIG. 2A is the cross-sectional view of the imaging apparatus along a plane passing through the center of an outer shell and being perpendicular to a P axis. FIG. 2B is the cross-sectional view of the imaging apparatus along a B-B line illustrated in FIG. 2A.

FIGS. 3A and 3B illustrate a camera body. FIG. 3A is a perspective view of the camera body. FIG. 3B is a front view of the camera body.

DETAILED DESCRIPTION

Embodiments are described in detail below with reference to the attached drawings. However, unnecessarily detailed description may be omitted. For example, detailed description of well known techniques or description of the substantially same elements may be omitted. Such omission is intended to prevent the following description from being unnecessarily redundant and to help those skilled in the art easily understand it.

Inventor(s) provides the following description and the attached drawings to enable those skilled in the art to fully understand the present disclosure. Thus, the description and the drawings are not intended to limit the scope of the subject matter defined in the claims.

<<First Embodiment>>

<1. External Appearance>

Figure 1:
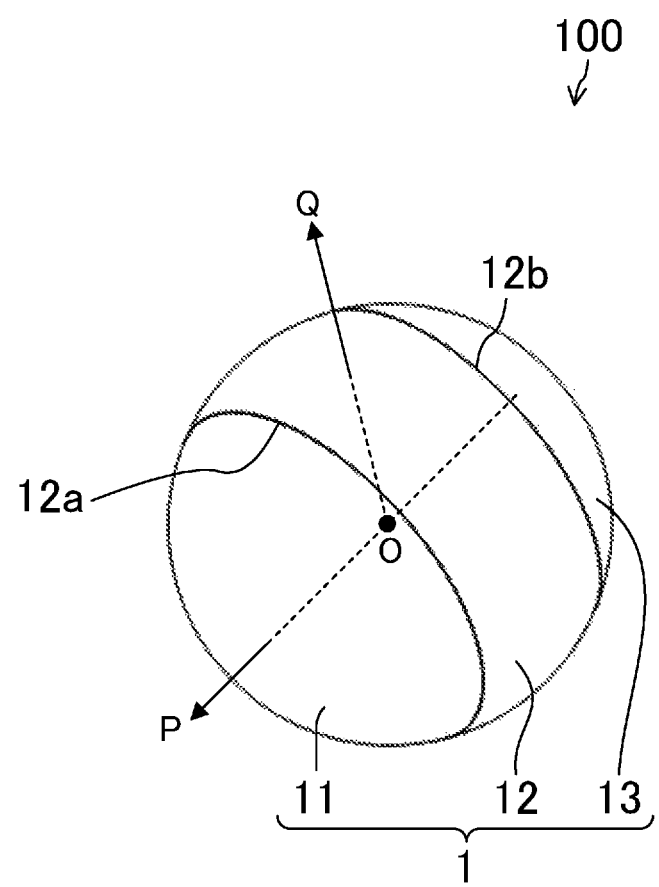
FIG. 1 is a perspective view of an imaging apparatus of a first embodiment.
Figure 2A:
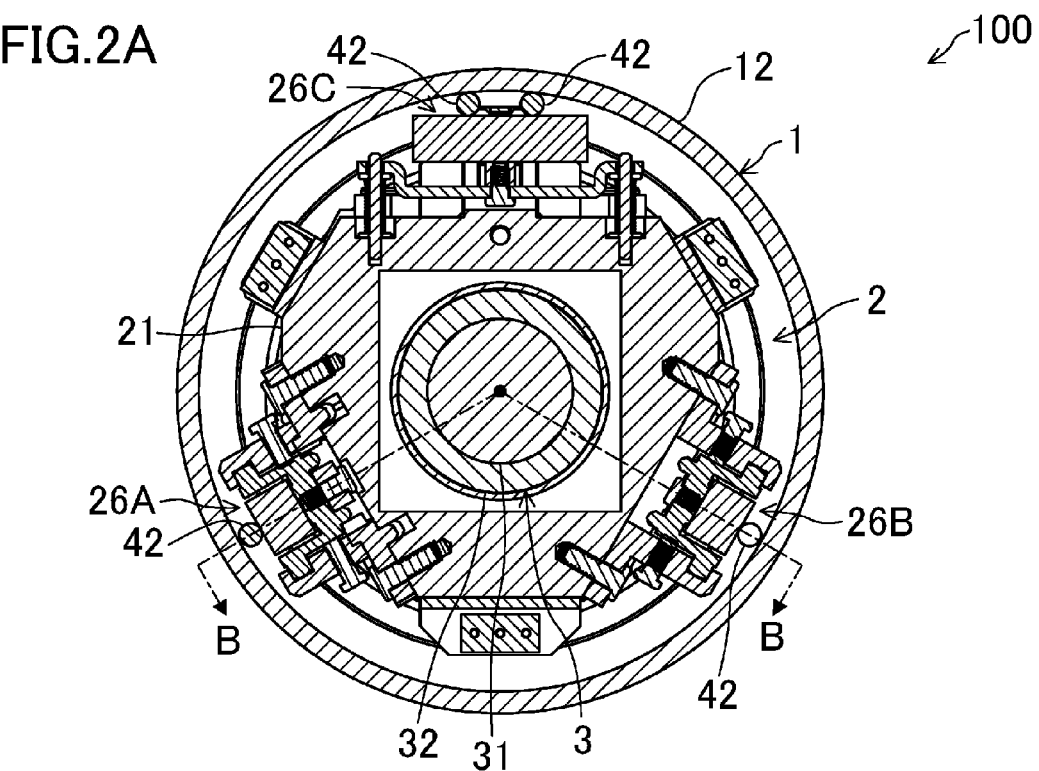
FIGS. 2A and 2B are cross-sectional views of the imaging apparatus.
Figure 2B:
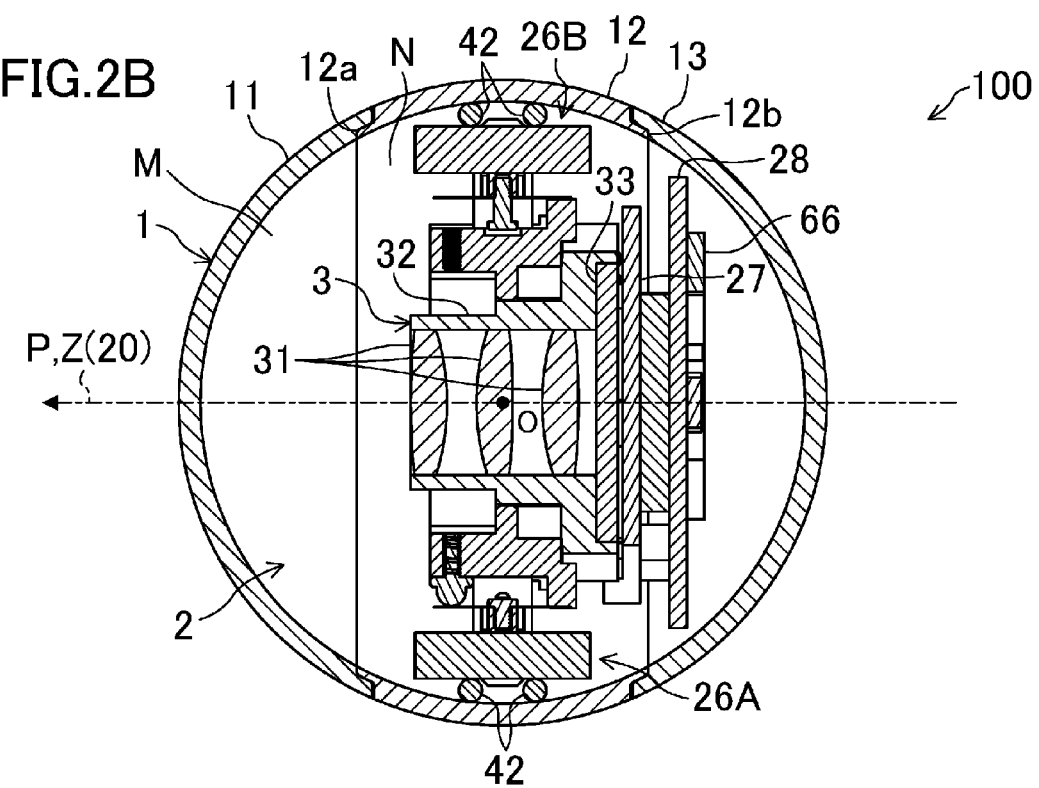

FIG. 1 is a perspective view of an imaging apparatus 100. FIGS. 2A and 2B are cross-sectional views of the imaging apparatus 100. FIG. 2A is the cross-sectional view of the imaging apparatus 100 along a plane passing through the center O of an outer shell 1 and being perpendicular to a P axis, and FIG. 2B is the cross-sectional view of the imaging apparatus 100 along a B-B line illustrated in FIG. 2A.

The imaging apparatus 100 includes the substantially spherical outer shell 1 and a camera body 2 arranged inside the outer shell 1. The camera body 2 moves relative to the outer shell 1 along an inner surface of the outer shell 1. While moving inside the outer shell 1, the camera body 2 shoots, through the outer shell 1, an image of an object outside the outer shell 1. The imaging apparatus 100 is one example of a drive apparatus.

<2. Outer Shell>

The outer shell 1 includes a first case 11, a second case 12, and a third case 13. The first case 11 and the second case 12 are joined together, and the second case 12 and the third case 13 are joined together. The entirety of the outer shell 1 is in a substantially spherical shape. The outer shell 1 has a substantially spherical inner surface. The outer shell 1 is one example of a case.

The first case 11 is formed in a spherical-sector shape so as not to have the great circle of the outer shell 1. An inner surface of the first case 11 has an inner spherical sector surface. The first case 11 is made of glass transparent to visible light. The "spherical sector" means a "spherical zone" formed with only one opening.

The second case 12 is formed in a spherical-zone shape so as to have the great circle of the outer shell 1, and is formed with two openings 12a, 12b. The openings 12a, 12b each form a small circle of the outer shell 1, and are parallel to the great circle of the outer shell 1. Moreover, the openings 12a, 12b have the same diameter. That is, the distance between the opening 12a and the great circle is identical to that between the opening 12b and the great circle. The first case 11 is joined to the second case 12 at the opening 12a. The third case 13 is joined to the second case 12 at the opening 12b. The second case 12 is formed so as to have an inner spherical zone surface. The second case 12 is made of glass transparent to visible light.

The third case 13 is formed in a spherical-sector shape so as not to have the great circle of the outer shell 1. The third case 13 is formed so as to have an inner spherical sector surface. The third case 13 is made of glass transparent to visible light.

The inner surface of the first case 11, an inner surface of the second case 12, and an inner surface of the third case 13 have the substantially same curvature.

Note that the first to third cases 11-13 may be made of a material other than glass. For example, the first to third cases 11-13 may be made of, e.g., acrylic resin, polycarbonate resin, or ceramics. In such a manner that the first to third cases 11-13 are made of a high hardness material such as glass, abrasion due to contact with a driver element 42 which will be described later.

Referring to FIG. 1, the center point (i.e., the center of the second case 12) of the outer shell 1 is defined as an "0 point," a straight line passing through the 0 point and the centers of the two openings of the second case 12 is defined as a "P axis," and an axis passing through the 0 point so as to be perpendicular to the P axis is defined as a "Q axis."

<3. Camera Body>

Figure 4:
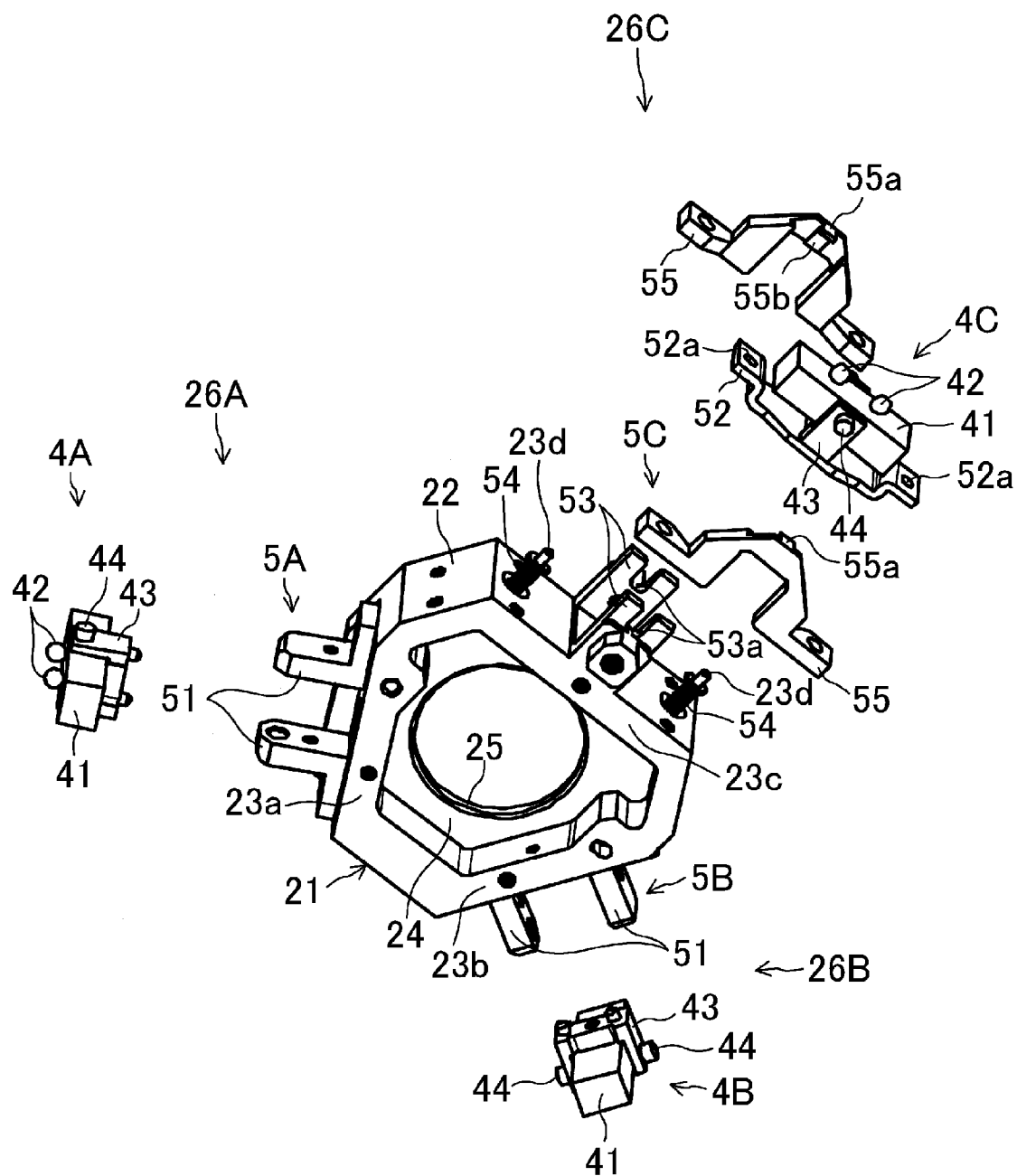
FIG. 4 is an exploded perspective view of a movable frame and first to third drivers.

FIGS. 3A and 3B illustrate the camera body 2. FIG. 3A is a perspective view of the camera body 2, and FIG. 3B is a front view of the camera body 2. FIG. 4 is an exploded perspective view of a movable frame 21 and first to third drivers 26A-26C.

The camera body 2 includes the movable frame 21, a lens barrel 3, the first to third drivers 26A-26C attached to the movable frame 21, an attachment plate 27 configured to attach the lens barrel 3 to the movable frame 21, and a circuit board 28 configured to control the camera body 2. The camera body 2 can shoot still images and moving pictures. An optical axis 20 of the lens barrel 3 is referred to as a "Z axis," and a side close to an object relative to the optical axis 20 is referred to as a "front side." The camera body 2 is one example of a movable body.

The movable frame 21 is a substantially equilateral-triangular frame body as viewed from the front. The movable frame 21 includes an outer peripheral wall 22 which has first to third side walls 23a-23c forming three sides of the triangle, and a dividing wall 24 formed inside the outer peripheral wall 22. An opening 25 is formed at the center of the dividing wall 24.

The lens barrel 3 includes a plurality of lenses 31 having the optical axis 20, a lens frame 32 configured to hold the lenses 31, and an imaging device 33. The lens frame 32 is arranged inside the movable frame 21, and the optical axis 20 passes through the center of the movable frame 21. The attachment plate 27 is provided on a back side of the imaging device 33 of the lens barrel 3 (see FIG. 2B). The lens barrel 3 is attached to the movable frame 21 through the attachment plate 27. The circuit board 28 is attached to the attachment plate 27 on a side opposite to the lens barrel 3.

The first to third drivers 26A-26C are provided on an outer peripheral surface of the movable frame 21. Specifically, the first driver 26A is provided on the first side wall 23a. The second driver 26B is provided on the second side wall 23b. The third driver 26C is provided on the third side wall 23c. The first to third drivers 26A-26C are arranged about the Z axis at substantially equal intervals, i.e., at about every 120°. Referring to FIG. 3B, an axis passing through the third driver 26C so as to be perpendicular to the Z axis is referred to as a "Y axis," and an axis perpendicular to both of the Z and Y axes is referred to as an "X axis."

The first driver 26A includes an actuator body 4A and a first support mechanism 5A. The second driver 26B includes an actuator body 4B and a second support mechanism 5B. The third driver 26C includes an actuator body 4C and a third support mechanism 5C.

The actuator bodies 4A-4C have the same configuration. Only the actuator body 4A will be described below, and the description of the actuator bodies 4B, 4C will not be repeated. The actuator body 4A includes an oscillator 41, two driver elements 42 attached to the oscillator 41, and a holder 43 configured to hold the oscillator 41.

The oscillator 41 is a piezoelectric device made of multilayer ceramic. The oscillator 41 is formed in a substantially rectangular parallelepiped shape. In such a manner that predetermined drive voltage (alternating voltage) is applied to an electrode (not shown in the figure) of the oscillator 41, the oscillator 41 harmonically generates stretching vibration in a longitudinal direction of the oscillator 41 and bending vibration in a transverse direction of the oscillator 41.

The driver elements 42 are, on one side surface of the oscillator 41, arranged in the longitudinal direction of the oscillator 41. The driver element 42 is a ceramic spherical body, and is bonded to the oscillator 41. The stretching vibration and the bending vibration of the oscillator 41 generates elliptic motion of each of the driver elements 42. By the elliptic motion of the driver elements 42, drive force in the longitudinal direction of the oscillator 41 is output.

The holder 43 is made of polycarbonate resin containing glass. The holder 43 sandwiches the oscillator 41 from both sides in a layer stacking direction (i.e., a direction perpendicular to both of the longitudinal and transverse directions) of the oscillator 41. The holder 43 is bonded to the oscillator

41. In the holder 43, a rotary shaft 44 extending in the layer stacking direction of the oscillator 41 is provided so as to outwardly protrude.

The first support mechanism 5A includes two brackets 51. The brackets 51 are screwed to an outer surface of the first side wall 23a. The brackets 51 rotatably support the rotary shaft 44 of the holder 43 with the actuator body 4A being sandwiched between the brackets 51. Thus, the actuator body 4A is supported by the first support mechanism 5A so as to rotate about an axis which is parallel to a plane perpendicular to the Z axis and which is parallel to the first side wall 23a. In such a state, the driver elements 42 of the actuator body 4A are arranged parallel to the Z axis.

The second support mechanism 5B has a configuration similar to that of the first support mechanism 5A, and includes two brackets 51. The brackets 51 are screwed to an outer surface of the second side wall 23b. The brackets 51 rotatably support the rotary shaft 44 of the holder 43 with the actuator body 4B being sandwiched between the brackets 51. Thus, the actuator body 4B is supported by the second support mechanism 5B so as to rotate about the axis which is parallel to the plane perpendicular to the Z axis and which is parallel to the second side wall 23b. In such a state, the driver elements 42 of the actuator body 4B are arranged parallel to the Z axis.

The third support mechanism 5C includes a holding plate 52 attached to the holder 43, two supports 53 configured to support the rotary shaft 44 of the actuator body 4C, two biasing springs 54, and stoppers 55 configured to restrict movement of the rotary shaft 44. The holding plate 52 is screwed to the holder 43. The holding plate 52 is a plate-shaped member extending in the longitudinal direction of the oscillator 41, and an opening 52a is formed in each end part of the holding plate 52. A tip end of a pin 23d which will be described later is inserted into the opening 52a. The supports 53 are arranged parallel to a Z-axis direction on the third side wall 23c. A guide groove 53a engaged with the rotary shaft 44 is formed at a tip end of the support 53. The guide groove 53a extends in a direction perpendicular to the Z axis. The rotary shaft 44 of the holder 43 is fitted into the guide grooves 53a so as to move back and forth in a longitudinal direction of the guide groove 53a and to rotate about an axis of the rotary shaft 44. Each tip end of the rotary shaft 44 protrudes beyond the support 53 in the Z-axis direction. Two pins 23d are provided on an outer surface of the third side wall 23c. The biasing spring 54 is fitted onto the pin 23d. The stopper 55 includes a first restrictor 55a configured to restrict movement of the rotary shaft 44 in the longitudinal direction (i.e., a direction in which the guide groove 53a extends) of the guide groove 53a, and a second restrictor 55b configured to restrict movement of the rotary shaft 44 in a direction parallel to the Z axis. The stoppers 55 are screwed to the third side wall 23c. In the state in which the stoppers 55 are attached to the third side wall 23c, each of the first restrictors 55a is fitted into a tip end of the guide groove 53a (see FIG. 3A). In the state in which the stoppers 55 are attached to the third side wall 23c, each of the second restrictors 55b is arranged at a position facing the tip end of the rotary shaft 44 engaged with the guide grooves 53a.

In the third support mechanism 5C configured as described above, the actuator body 4C is mounted in the supports 53 such that the rotary shaft 44 of the holder 43 is fitted into the guide grooves 53a. The holding plate 52 and the third side wall 23c sandwich the biasing springs 54, thereby compressing and deforming the biasing springs 54. In such a state, the stoppers 55 are screwed to the third side wall 23c. The actuator body 4C is, by elastic force of the biasing springs 54, biased toward a side apart from the Z axis in the direction perpendicular to the Z axis. Since each of the tip ends of the guide grooves 53a is closed by the first restrictor 55a of the stopper 55, the rotary shaft 44 is prevented from being detached from the guide grooves 53a. Moreover, since each of the second restrictors 55b of the stoppers 55 is arranged at the position facing the tip end of the rotary shaft 44, movement of the actuator body 4C in the Z-axis direction is restricted by the second restrictors 55b. That is, the actuator body 4C is supported by the third support mechanism 5C so as to move in the longitudinal direction of the guide groove 53a and to rotate about the rotary shaft 44.

Figure 5:
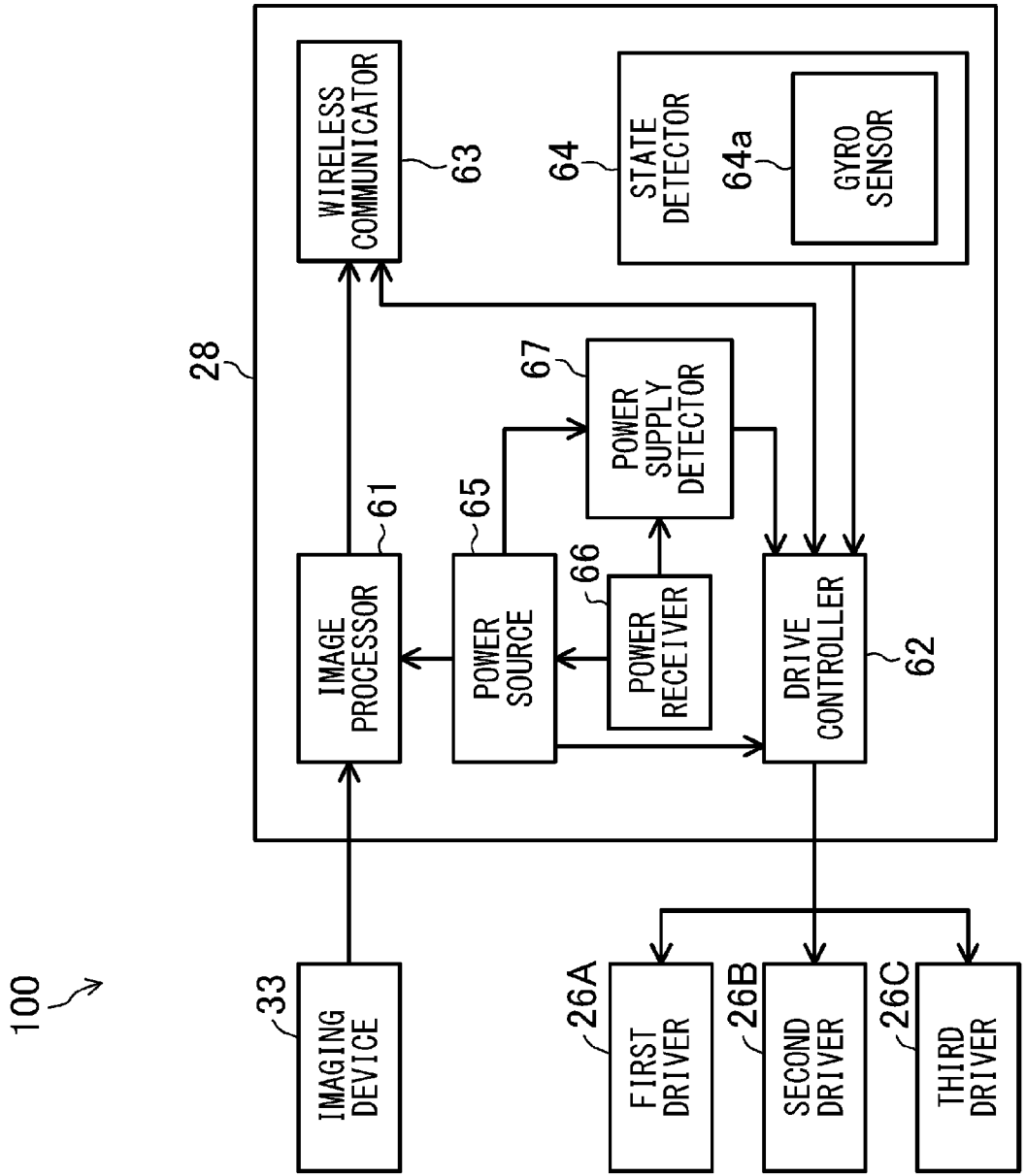
FIG. 5 is a functional block diagram of the imaging apparatus.

FIG. 5 is a functional block diagram of the imaging apparatus 100. The circuit board 28 includes an image processor 61 configured to perform video signal processing based on an output signal from the imaging device 33, a drive controller 62 configured to control driving of the first to third drivers 26A-26C, a wireless communicator 63 configured to transmit/receive a wireless signal, a state detector 64 configured to detect the state of the camera body 2, a power source 65 configured to supply power to each part of the camera body 2 including the first to third drivers 26A-26C, a power receiver 66 configured to receive power from the outside and supply the power to the power source 65, and a power supply detector 67 configured to determine a power reception state of the power receiver 66.

The state detector 64 includes a gyro sensor 64a configured to detect the angular velocity of the camera body 2. The gyro sensor 64a is for three detection axes. That is, the gyro sensor 64a is a sensor package including an X-axis gyro sensor configured to detect an angular velocity about the X axis, a Y-axis gyro sensor configured to detect an angular velocity about the Y axis, and a Z-axis gyro sensor configured to detect an angular velocity about the Z axis. The gyro sensor 64a is configured to output a signal corresponding to an angular velocity about each of the detection axes. Rotational movement of the camera body 2 can be detected based on an output signal of the gyro sensor 64a.

The image processor 61 is configured to perform, e.g., amplification and A/D conversion of an output signal of the imaging device 33. The drive controller 62 is configured to receive power from the power source 65 to generate predetermined drive voltage and to output the drive voltage to each of the first to third drivers 26A-26C. The drive controller 62 generates the drive voltage based on a signal (command) input from the outside through the wireless communicator 63 and an output signal of the gyro sensor 64a.

The power receiver 66 is configured to receive, in a non-contact state, power from an external power transmission device 9 which will be described later. The power receiver 66 supplies received power to the power source 65 to charge the power source 65. Referring to FIG. 2B, the power receiver 66 is provided on a surface of the circuit board 28 opposite to the lens barrel 3. That is, the power receiver 66 faces the inner surface of the outer shell 1. The power supply detector 67 is configured to determine the magnitude of power received by the power receiver 66. The power supply detector 67 is one example of a determinator.

<4. Arrangement of Camera Body inside Outer Shell>

Referring to FIGS. 2A and 2B, the camera body 2 is arranged inside the outer shell 1. The state in which the Z axis of the camera body 2 and the P axis of the outer shell 1 are coincident with each other is referred to as a "reference state." That is, FIGS. 2A and 2B illustrate the reference state of the imaging apparatus 100. Each of the driver elements 42 of the first to third drivers 26A-26C contacts the inner surface of the second case 12. The lens barrel 3 faces the first case 11, and the camera body 2 shoots an image of an object outside the outer shell 1 through the opening 12a. The circuit board 28 is positioned inside the third case 13 in the reference state. The third driver 26C is movable in a radial direction about the Z axis, and is biased toward the outside in the radial direction by the biasing springs 54. Thus, the driver elements 42 of the third driver 26C contact the inner surface of the second case 12 in the state in which the driver elements 42 are pressed against the inner surface of the second case 12 by elastic force of the biasing springs 54. The driver elements 42 of the first and second drivers 26A, 26B contact the inner surface of the second case 12 in the state in which the driver elements 42 are pressed against the inner surface of the second case 12 by reactive force of the biasing springs 54. In the reference state, the driver elements 42 of the first driver 26A are arranged parallel to the P axis. The driver elements 42 of the second driver 26B are arranged parallel to the P axis. On the other hand, the driver elements 42 of the third driver 26C are arranged in a circumferential direction of the great circle of the outer shell 1, i.e., in a circumferential direction about the P axis. The actuator body 4C of the third driver 26C is movable in the radial direction about the Z axis, and each of the actuator bodies 4A-4C of the first to third drivers 26A-26C is supported so as to rotate about the rotary shaft 44. Thus, e.g., a shape error of the inner surface of the outer shell 1 and an assembly error of each of the drivers are absorbed.

<5. Operation of Camera Body>

When drive voltage is applied to the first to third drivers 26A-26C, elliptic motion of each of the driver elements 42 of the first to third drivers 26A-26C is generated. Upon the elliptic motion of the driver elements 42, the first driver 26A outputs drive force in the direction parallel to the Z axis. The second driver 26B outputs drive force in the direction parallel to the Z axis. The third driver 26C outputs drive force in a circumferential direction about the Z axis. Thus, the drive force of the first driver 26A and the drive force of the second driver 26B can be combined together, thereby arbitrarily adjusting the inclination of the Z axis of the camera body 2 relative to the P axis of the outer shell 1. Moreover, the camera body 2 can rotate about the Z axis by the drive force of the third driver 26C. As in the foregoing, in such a manner that the drive force of the first to third drivers 26A-26C is adjusted, the camera body 2 can rotationally move relative to the outer shell 1, and the attitude of the camera body 2 on the outer shell 1 can be arbitrarily adjusted.

Figure 6:
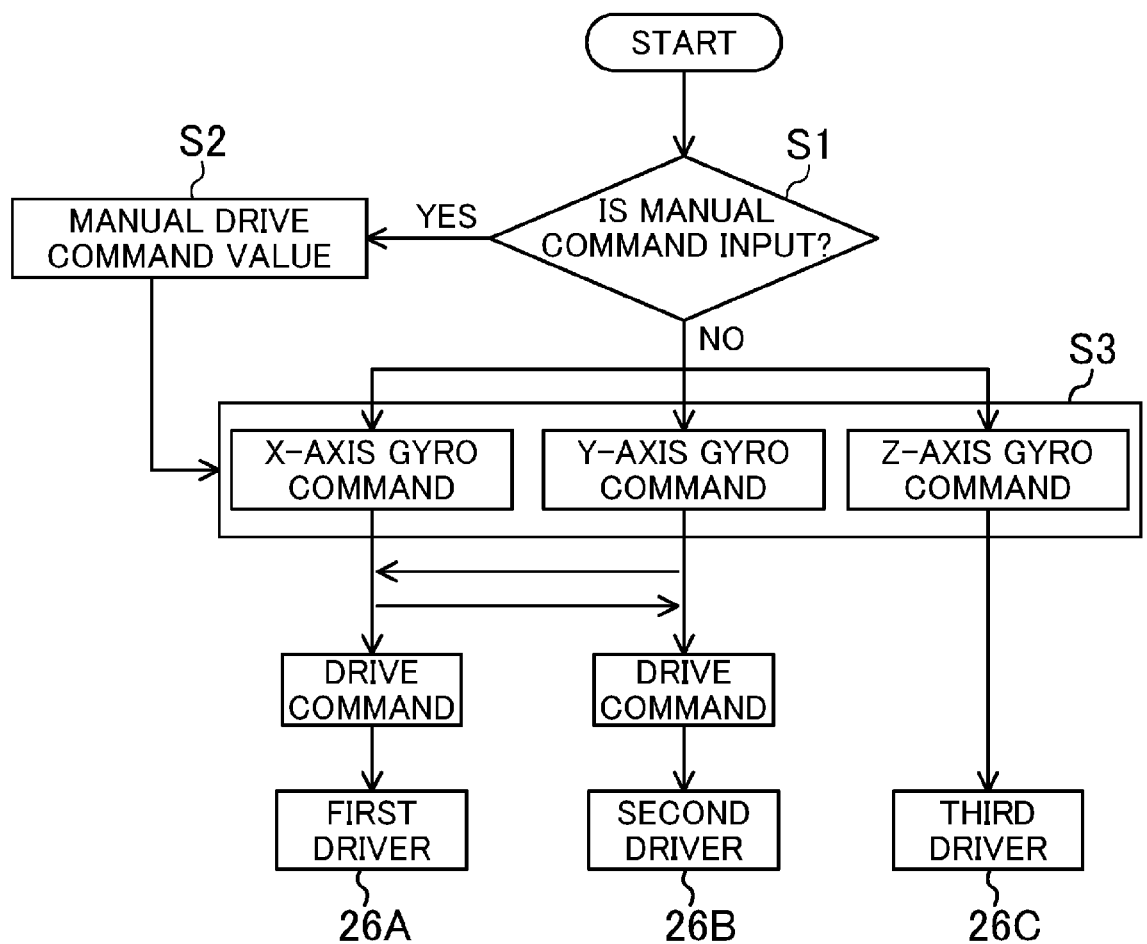
FIG. 6 is a flowchart of a drive control.

FIG. 6 is a flowchart of a drive control.

First, the drive controller 62 determines, at step S1, whether or not a manual command is input from the outside through wireless communication. The manual command is, e.g., a command to follow a particular object or a command to perform panning (i.e., rotation about the Y axis), tilting (i.e., rotation about the X axis), or rolling (i.e., rotation about the Z axis) of the camera body 2 at a predetermined angle. If the manual command is input, the drive controller 62 proceeds to step S2. On the other hand, if no manual command is input, the drive controller 62 proceeds to step S3.

At step S2, the drive controller 62 generates manual drive command values based on the manual command. The manual drive command value is a command value for each of the first to third drivers 26A-26C. Subsequently, the process proceeds to step S3.

At step S3, the drive controller 62 generates, based on output of the gyro sensor 64a, a command value for canceling rotation of the camera body 2 due to disturbance. Specifically, the drive controller 62 generates, based on a detection signal of the gyro sensor 64a, a command value (hereinafter referred to as an "X-axis gyro command value") for rotation about the X axis, a command value (hereinafter referred to as a "Y-axis gyro command value") for rotation about the Y axis, and a command value (hereinafter referred to as a "Z-axis gyro command value) for rotation about the Z axis such that rotation about the X, Y, and Z axes of the camera body 2 is canceled. The X-axis gyro command value and the Y-axis gyro command value are synthesized at a predetermined rate, thereby generating a drive command value to be output to the first driver 26A. Moreover, the X-axis gyro command value and the Y-axis gyro command value are synthesized at a predetermined rate, thereby generating a drive command value to be output to the second driver 26B. The Z-axis gyro command value is output to the third driver 26C as a drive command value. If the manual drive command value is generated, a final drive command value is generated by adding the manual drive command value to a drive command value obtained based on the gyro command value. The drive controller 62 applies drive voltage corresponding to the generated drive command value to each of the first to third drivers 26A-26C.

As a result, if no manual command is input, the first to third drivers 26A-26C are operated such that disturbance acting on the camera body 2 is canceled, and therefore the attitude of the camera body 2, i.e., the direction of the optical axis 20, is maintained constant. On the other hand, if the manual command is input, the first to third drivers 26A-26C are operated such that disturbance acting on the camera body 2 is canceled and that the camera body 2 moves according to the manual command.

Since shaking of the camera body 2 upon rotation thereof is, regardless of presence/absence of the manual command, reduced based on an output of the gyro sensor 64a, blurring of a shot image is reduced. Moreover, the image processor 61 detects a motion vector of a moving picture and performs, by image processing, electronic correction of an image blur based on the motion vector. That is, in the imaging apparatus 100, a relatively-large image blur with a low frequency is reduced by controlling the attitude of the camera body 2, and a relatively-small image blur with a high frequency is corrected by electronic correction of the image processor 61.

<6. External Power Transmission Device>

Figure 7:
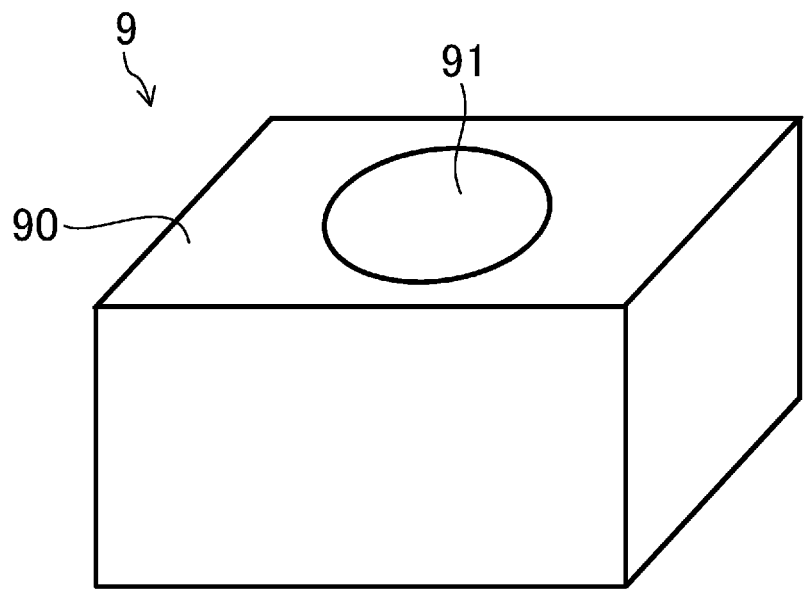
FIG. 7 is a perspective view of an external power transmission device.
Figure 8:
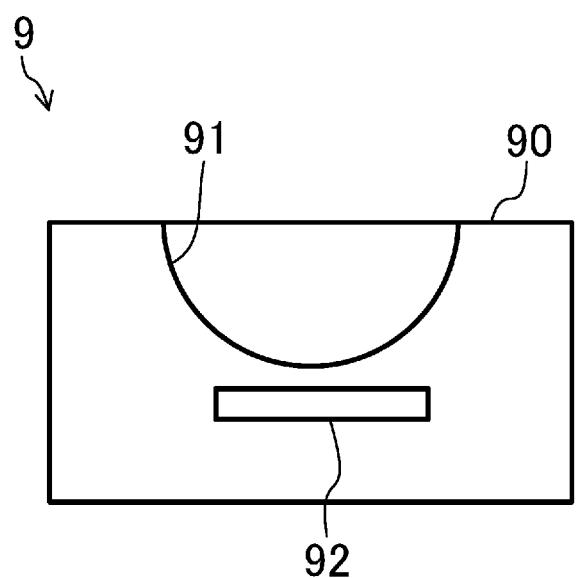
FIG. 8 is a cross-sectional view of the external power transmission device.

FIG. 7 is a perspective view of the external power transmission device 9. FIG. 8 is a cross-sectional view of the external power transmission device 9.

The external power transmission device 9 is a device configured to charge the imaging apparatus 100. The external power transmission device 9 includes a substantially rectangular parallelepiped body 90, a mounting part 91 formed in the body 90 such that the imaging apparatus 100 is mounted, and a power transmitter 92 provided inside the body 90.

The mounting part 91 is a recess formed in a substantially semispherical shape. The inner diameter of the mounting part 91 is equal to or slightly larger than the outer diameter of the outer shell 1.

The power transmitter 92 is arranged close to a bottom part (deepest part) of the mounting part 91. The power transmitter 92 is configured to transmit power to perform non-contact power supply.

<7. Charge Control>

Figure 9:
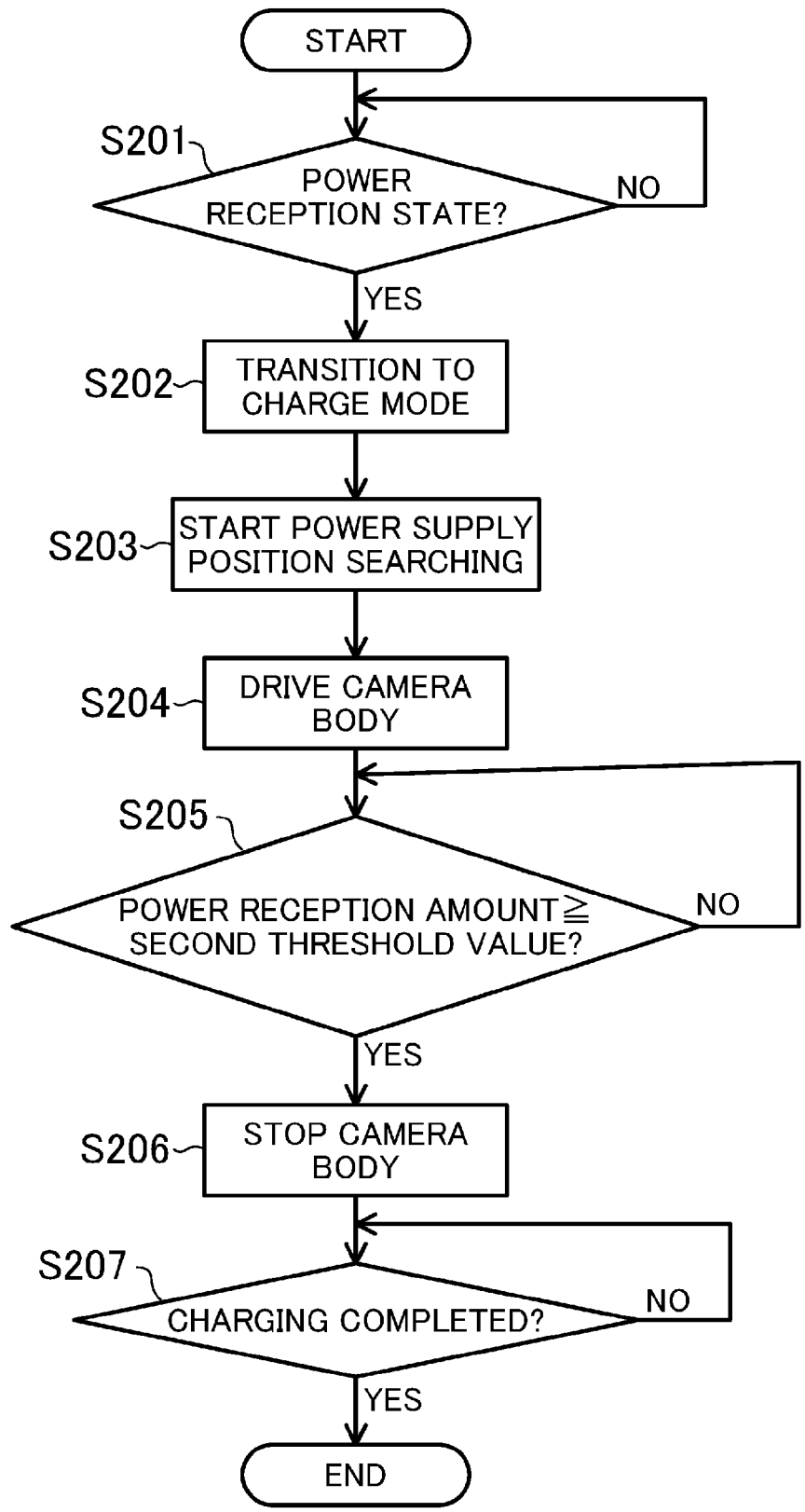
FIG. 9 is a flowchart of a charge control.

Next, a charge control of the imaging apparatus 100 will be described. FIG. 9 illustrates a flowchart of the charge control.

The imaging apparatus 100 is mounted on the external power transmission device 9 to start the charge control.

First, the power supply detector 67 determines, at step S201, whether or not the power receiver 66 is in the power reception state. Specifically, when power (hereinafter referred to as a "power reception amount") received by the power receiver 66 is equal to or greater than a predetermined first threshold value, the power supply detector 67 determines that the power receiver 66 is in the power reception state. On the other hand, when the power reception amount of the power receiver 66 is less than the predetermined first threshold value, the power supply detector 67 determines that the power receiver 66 is not in the power reception state. The first threshold value is a value based on which it can be determined whether or not power is supplied from the outside, and is set at a power reception amount equal to or greater than a noise level. When the power receiver 66 is in the power reception state, the process proceeds to step S202. On the other hand, when the power receiver 66 is not in the power reception state, step S201 is repeated. When the power supply detector 67 determines that the power receiver 66 is in the power reception state, the power supply detector 67 sends a command for transitioning to a charge mode to the drive controller 62.

That is, at step S201, reception of power equal to or greater than the predetermined first threshold value by the power receiver 66 is determined as the imaging apparatus 100 being mounted on the external power transmission device 9.

At step S202, the drive controller 62 causes the imaging apparatus 100 to transition from a normal mode in which an image is shot to the charge mode in which charging is performed.

When the drive controller 62 causes the imaging apparatus 100 to transition to the charge mode, the drive controller 62 starts, at step S203, searching of a power supply position of the camera body 2. Specifically, the drive controller 62 operates, at step S204, the first to third drivers 26A-26C to cause the camera body 2 to perform the searching. For example, the drive controller 62 causes the camera body 2 to move along a predetermined path. For example, the drive controller 62 causes the camera body 2 to rotate 360° about the Z axis multiple times as the direction of the Z axis is changed.

In such a state, the power supply detector 67 monitors the power reception amount of the power receiver 66, and determines whether or not the power reception amount is equal to or greater than a predetermined second threshold value (step S205). The second threshold value is set at such a power reception amount that power transmission/reception can be efficiently performed between the power receiver 66 and the power transmitter 92. When the power reception amount of the power receiver 66 is equal to or greater than the second threshold value, the power supply detector 67 sends a signal corresponding to such a state to the drive controller 62.

Upon reception of such a signal, the drive controller 62 stops movement of the camera body 2 (step S206). That is, the position of the camera body 2 in which the power reception amount of the power receiver 66 reaches equal to or greater than the second threshold value is the power supply position.

Subsequently, the camera body 2 stands by at the power supply position. The power receiver 66 receives power from the power transmitter 92, thereby charging the power source 65. In such a state, the drive controller 62 monitors the amount of charge of the power source 65, and determines whether or not charging is completed (step S207). When the amount of charge of the power source reaches equal to or greater than a predetermined amount, the drive controller 62 determines that charging is completed, and terminates the charge control.

Note that the imaging apparatus 100 may include an informing unit configured to inform various information to a user. The informing unit may be a display section including, e.g., an LED or a sound section such as a buzzer. For example, the following can be informed to a user by the informing unit: the amount of charge of the power source 65 is decreased; the imaging apparatus 100 is in the charge mode (i.e., the imaging apparatus 100 is being charged); and charging of the power source 65 is completed.

<8. Usage Example of Imaging Apparatus>

Figure 10:
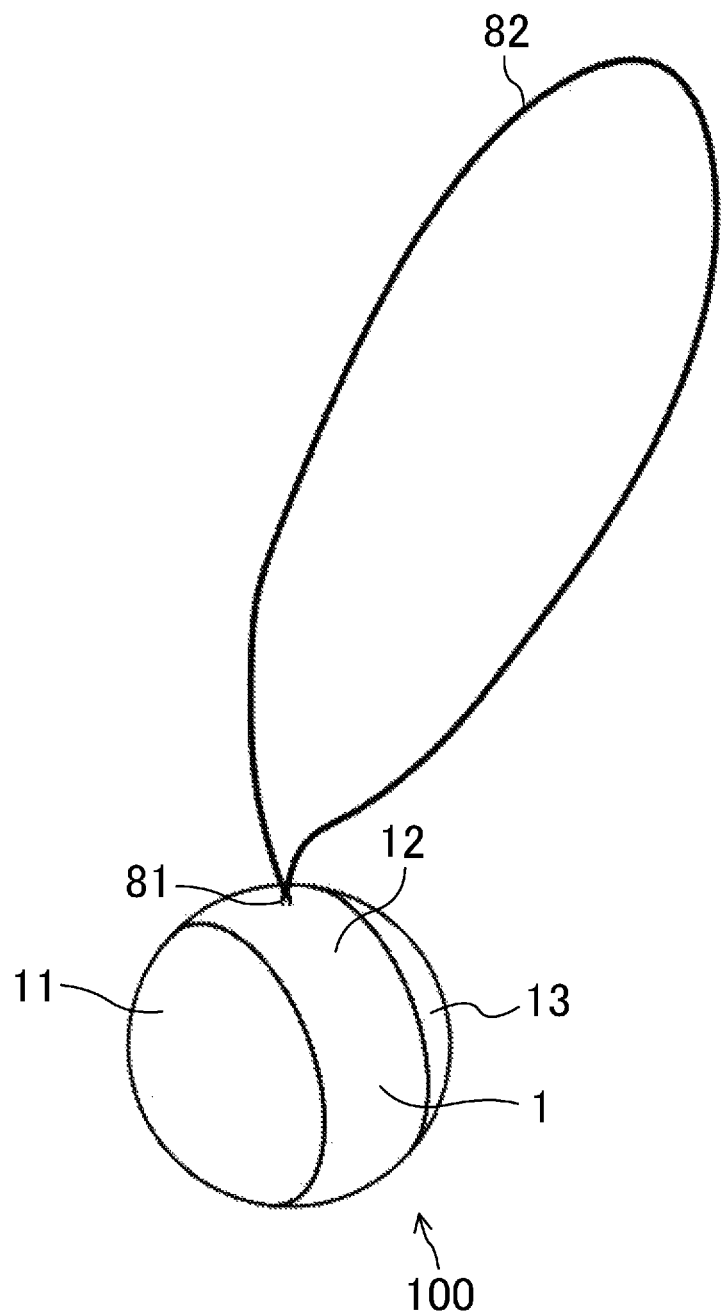
FIG. 10 is a view illustrating a usage example of the imaging apparatus.

FIG. 10 illustrates a usage example of the imaging apparatus 100.

A pin 81 is provided on an outer surface of the second case 12. A strap 82 is attached to the pin 81. A hook-and-loop fastener (not shown in the figure) is provided on an outer surface of the third case 13.

A user wears the strap 82 around a neck, and uses the imaging apparatus 100 with the imaging apparatus 100 being hung from the neck. In such a state, the hook-and-loop fastener is attached to, e.g., clothes, thereby reducing or preventing large shaking of the imaging apparatus 100 during walking etc.

The camera body 2 can be operated in panning, tilting, and rolling directions by a wireless communication device such as a smart phone. Moreover, image blurring during walking can be reduced by the gyro sensor 64a.

<9. Advantages>

Thus, the imaging apparatus 100 includes the outer shell 1, the camera body 2 arranged inside the outer shell 1 and moving along the outer shell 1, the first to third drivers 26A-26C arranged inside the outer shell 1 and configured to drive the camera body 2, the drive controller 62 configured to control the first to third drivers 26A-26C, the power source 65 arranged inside the outer shell 1 and configured to supply power to the first to third drivers 26A-26C, the power receiver 66 arranged inside the outer shell 1 so as to move together with the camera body 2 and configured to receive power from the outside of the outer shell 1 to supply the power to the power source 65, and the power supply detector 67 configured to determine, based on the power received by the power receiver 66, whether or not the power is supplied from the outside of the outer shell 1. When the power supply detector 67 determines that the power is supplied, the drive controller 62 controls the first to third drivers 26A-26C to move the camera body 2 to the predetermined power supply position.

According to such a configuration, the power receiver 66 which is capable of receiving power in a non-contact state allows charging of the power source 65 without removing the power source 65 out from the outer shell 1. Moreover, when the power supply detector 67 detects power supply from the outside, the drive controller 62 moves the camera body 2 to the predetermined power supply position. Thus, the camera body 2 automatically moves, without correction of arrangement of the imaging apparatus 100 with respect to the external power transmitter by a user, to the position where the power receiver 66 can efficiently receive power from the outside. As a result, charging of the power source 65 can be facilitated.

The power supply position is a position where power received by the power receiver 66 is equal to or greater than the predetermined second threshold value. Since the second threshold value is a value based on which it can be determined that power transmission/reception between the power transmitter 92 and the power receiver 66 is efficiently performed, electrical loss upon power transmission/reception is reduced, and therefore charging can be efficiently performed.

The power supply detector 67 functions as the power transmitter position detector configured to detect the position of the power transmitter 92 configured to perform non-contact power supply from the outside of the outer shell 1 to the power receiver 66. The drive controller 62 controls the first to third drivers 26A-26C based on a detection result of the power supply detector 67 to move the camera body 2 to the predetermined power supply position.

That is, the power supply detector 67 substantially detects the position of the power transmitter 92 based on the power reception amount of the power receiver 66. The power transmitter position detector allows the camera body 2 to be in a suitable position in association with the power transmitter 92. The power supply detector 67 is one example of the power transmitter position detector.

In the foregoing description, when the power reception amount of the power receiver 66 reaches equal to or greater than the second threshold value, searching of the camera body 2 is stopped. However, the present disclosure is not limited to such a configuration. For example, while monitoring the power reception amount of the power receiver 66, the drive controller 62 may cause the camera body 2 to continue searching to the end, and may determine the position where the power reception amount of the power receiver 66 is the maximum as the power supply position of the camera body 2. In such a case, the drive controller 62 moves the camera body 2 to the power supply position after completion of searching of the camera body 2.

<<Second Embodiment>>

Subsequently, an imaging apparatus 200 of a second embodiment will be described. In the first embodiment, the power supply position of the camera body 2 is searched based on the power reception amount of the power receiver 66, but searching of the power supply position is not limited to such a configuration. One example of searching of the power supply position will be described in the second embodiment. The same reference numerals as those shown in the first embodiment are used to represent equivalent elements of the imaging apparatus 200, and the description thereof will not be repeated. Differences will be mainly described.

Figure 11:
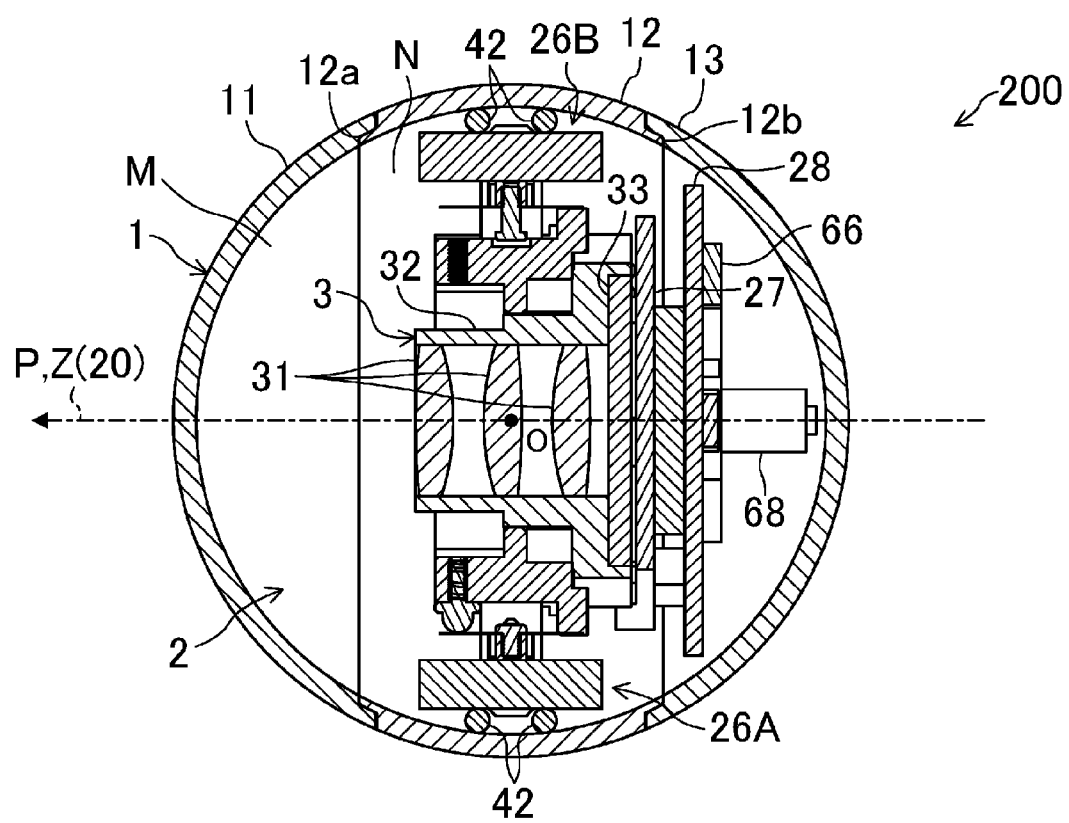
FIG. 11 is a cross-sectional view of an imaging apparatus of a second embodiment along a plane passing through the center of an outer shell and being perpendicular to a P axis.
Figure 12:
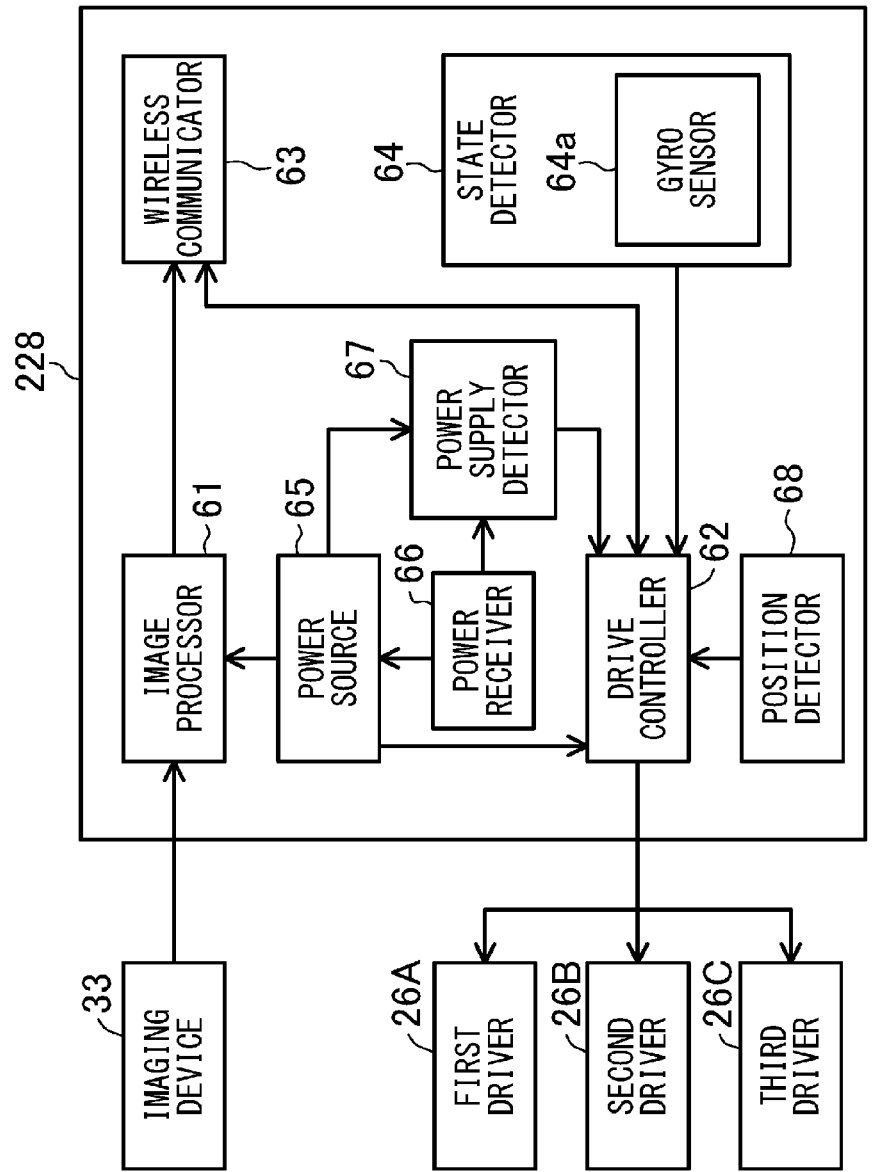
FIG. 12 is a functional block diagram of the imaging apparatus of the second embodiment.
Figure 13:
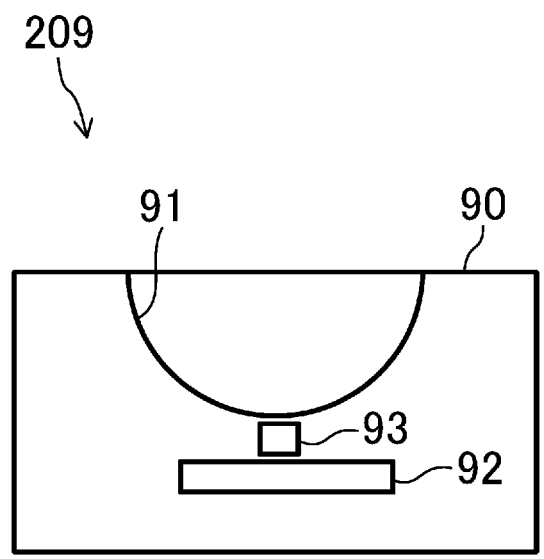
FIG. 13 is a cross-sectional view of an external power transmission device of the second embodiment.

FIG. 11 is a cross-sectional view of the imaging apparatus 200 along a plane passing through the center of an outer shell 1 and being perpendicular to a P axis. FIG. 12 is a functional block diagram of the imaging apparatus 200. FIG. 13 is a cross-sectional view of an external power transmission device 209.

<1. Configuration>

The external power transmission device 209 further includes a magnet 93 provided inside a body 90. The magnet 93 is arranged near a power transmitter 92.

The imaging apparatus 200 includes a position detector 68 provided in a camera body 2 and configured to detect the position of the power transmitter 92 of the external power transmission device 209. The position detector 68 includes a magnetic sensor formed of, e.g., a Hall element. The position detector 68 is arranged near a power receiver 66 on a surface of a circuit board 228 opposite to a lens barrel 3. The position detector 68 outputs an output signal having a magnitude proportional to the intensity of a detected magnetic field. The position detector 68 outputs such an output signal to a drive controller 62.

A positional relationship among a power receiver 66, the position detector 68, the power transmitter 92, and the magnet 93 is set such that the power receiver 66 is close to the power transmitter 92 to efficiently perform power transmission/reception between the power receiver 66 and the power transmitter 92 when the position detector 68 detects the magnetic field of the magnet 93. That is, the position detector 68 detects the magnetic field of the magnet 93 to substantially detect the position of the power transmitter 92. The position detector 68 is one example of a power transmitter position detector.

<2. Charge Control>

Figure 14:
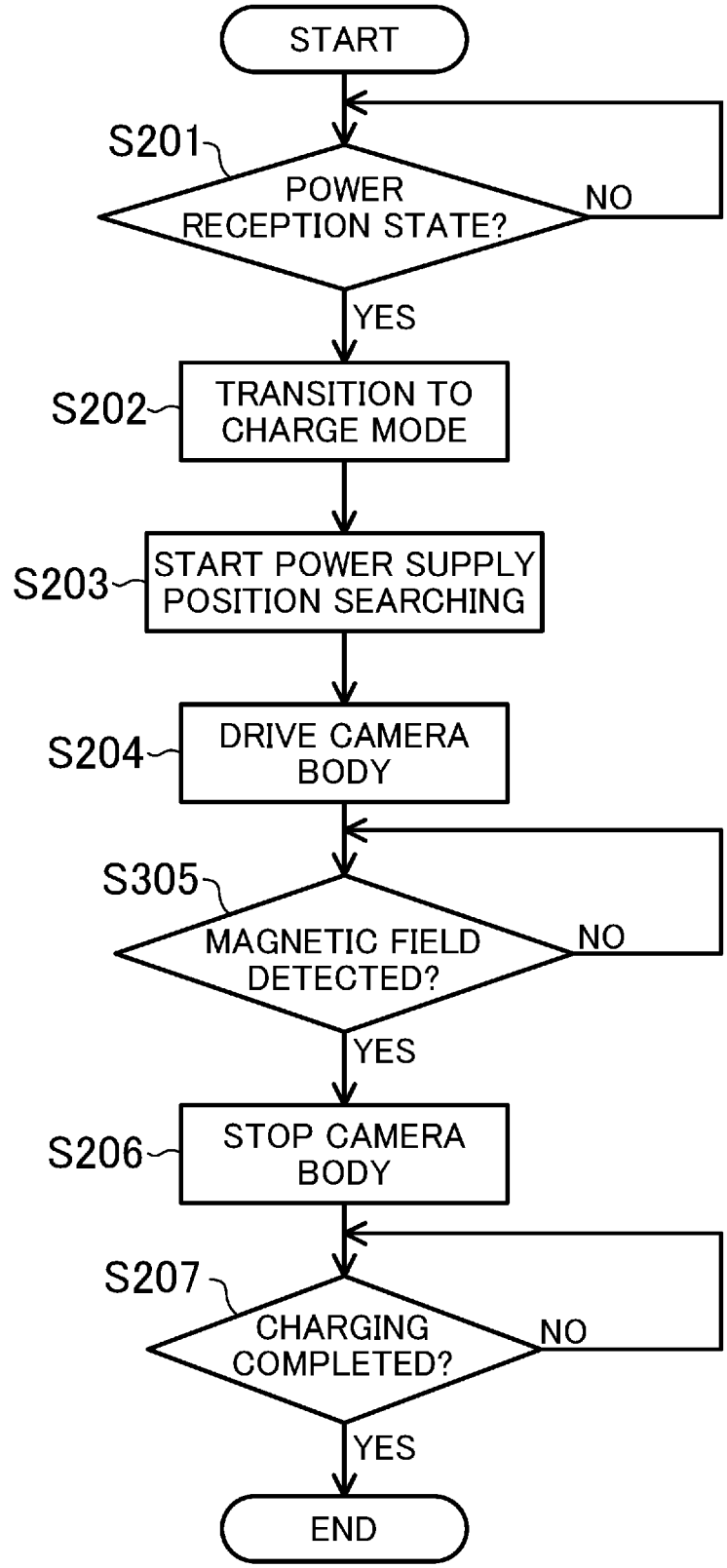
FIG. 14 is a flowchart of a charge control of the second embodiment.

FIG. 14 is a flowchart of a charge control.

In the charge control of the imaging apparatus 200, a process (steps S201-S204) until a power reception state is determined and the camera body 2 performs searching is similar to that of the first embodiment.

While the camera body 2 is performing searching, the drive controller 62 searches a power supply position of the camera body 2 based on an output signal of the position detector 68. The drive controller 62 determines, at step S305, whether or not the position detector 68 detects the magnetic field. More specifically, the drive controller 62 determines whether or not an output signal of the position detector 68 is equal to or greater than a predetermined value. When the position detector 68 detects the magnetic field, the drive controller 62 determines that the camera body 2 is positioned at the power supply position, and the drive controller 62 stops searching of the camera body 2 at step S206. A subsequent process (step S207) for determining whether or not charging is completed is the same as that of the first embodiment.

<3. Advantages>

Thus, the imaging apparatus 200 includes the outer shell 1, the camera body 2 arranged inside the outer shell 1 and moving along the outer shell 1, first to third drivers 26A-26C arranged inside the outer shell 1 and configured to drive the camera body 2, the drive controller 62 configured to control the first to third drivers 26A-26C, a power source 65 arranged inside the outer shell 1 and configured to supply power to the first to third drivers 26A-26C, the power receiver 66 arranged inside the outer shell 1 so as to move together with the camera body 2 and configured to receive power from the outside of the outer shell 1 to supply the power to the power source 65, and a power supply detector 67 configured to determine, based on the power received by the power receiver 66, whether or not the power is supplied from the outside of the outer shell 1. When the power supply detector 67 determines that the power is supplied, the drive controller 62 controls the first to third drivers 26A-26C to move the camera body 2 to the predetermined power supply position.

The imaging apparatus 200 further includes the position detector 68 configured to detect the position of the power transmitter 92 configured to perform non-contact power supply from the outside of the outer shell 1 to the power receiver 66. The drive controller 62 controls the first to third drivers 26A-26C based on a detection result of the position detector 68 to move the camera body 2 to the predetermined power supply position.

The power supply position is a position where the position detector 68 detect the magnetic field of the magnet 93.

In the foregoing description, the position of the power transmitter 92 is detected by the magnetic sensor provided in the camera body 2 and the magnet 93 provided in the external power transmission device 209. However, the present disclosure is not limited to such a configuration. As long as the position of the camera body 2 with respect to the external power transmission device 209 is detectable, any units can be employed. For example, a capacitive proximity sensor may be used to detect the position of the power transmitter 92.

<<Third Embodiment>>

Subsequently, an imaging apparatus 300 of a third embodiment will be described. The third embodiment is different from the first and second embodiments in a method for searching a power supply position of a camera body 2. The same reference numerals as those shown in the first embodiment are used to represent equivalent elements of the imaging apparatus 300 of the third embodiment, and the description thereof is not repeated. Differences will be mainly described.

<1. Configuration>

Figure 15:
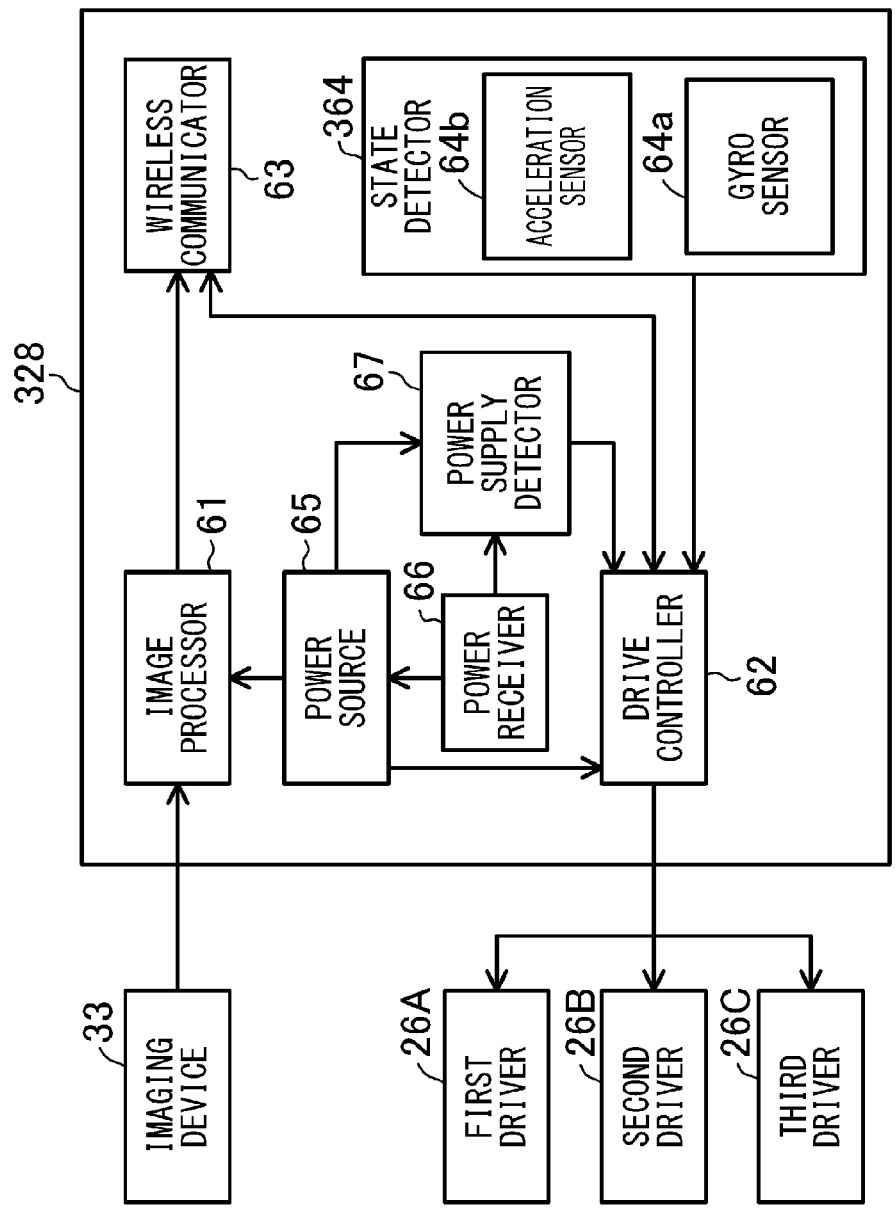
FIG. 15 is a functional block diagram of an imaging apparatus of a third embodiment.

FIG. 15 is a functional block diagram of the imaging apparatus 300.

A state detector 364 of the imaging apparatus 300 includes an acceleration sensor 64b. The acceleration sensor 64b is a sensor package including an X-axis acceleration sensor configured to detect acceleration in an X-axis direction, a Y-axis acceleration sensor configured to detect acceleration in a Y-axis direction, and a Z-axis acceleration sensor configured to detect acceleration in a Z-axis direction. The acceleration sensor 64b is provided on a circuit board 328. Since the circuit board 328 moves together with the camera body 2, the attitude of the camera body 2 is detectable based on output of the acceleration sensor 64b. The acceleration sensor 64b is one example of an attitude detector.

<2. Charge Control>

Figure 16:
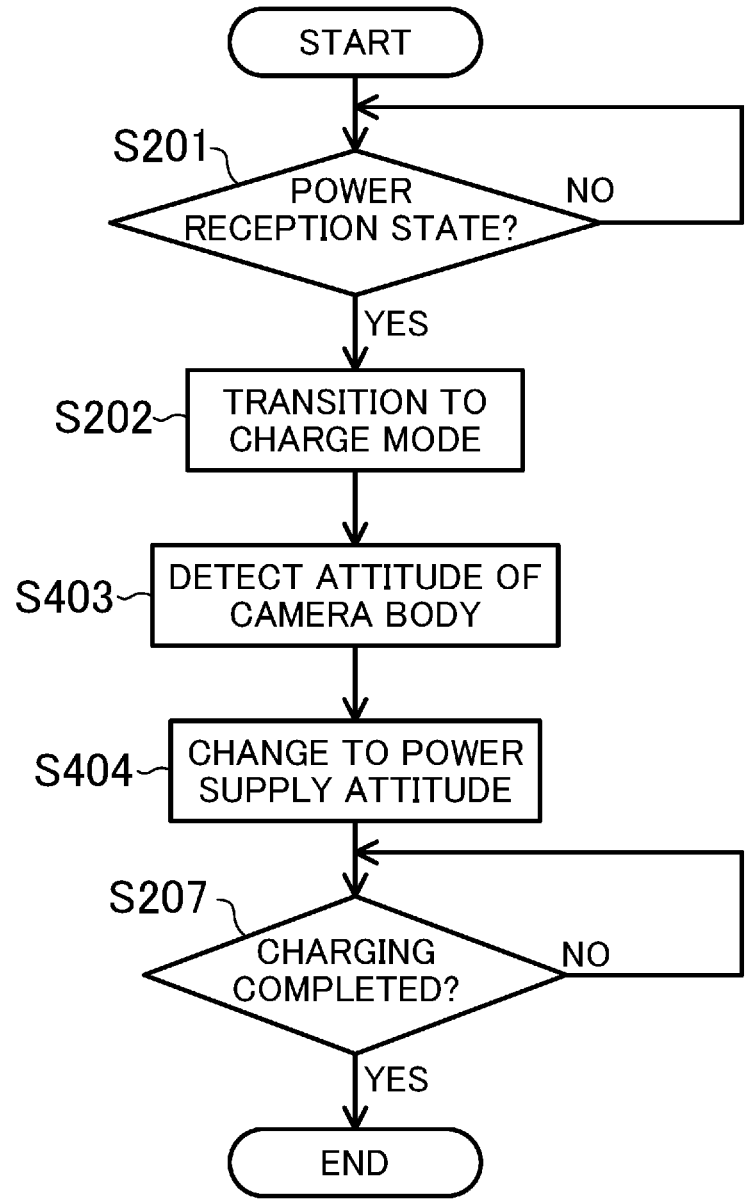
FIG. 16 is a flowchart of a charge control of the third embodiment.

FIG. 16 is a flowchart of a charge control.

In the charge control of the imaging apparatus 300, a process (steps S201-S202) until a power reception state is determined and the imaging apparatus 300 transitions to a charge mode is similar to that of the first embodiment.

When the imaging apparatus 300 transitions to the charge mode, a drive controller 62 detects the attitude of the camera body 2 at step S403. Subsequently, the drive controller 62 operates, at step S404, first to third drivers 26A-26C, and moves the camera body 2 such that the camera body 2 is in a power supply attitude. Typically, an external power transmission device 9 is arranged on a place horizontal to the ground surface. The position of a power transmitter 92 in the external power transmission device 9 is fixed. Thus, the proximity of a power receiver 66 to the power transmitter 92 is determined depending on the attitude of the camera body 2 with respect to the ground surface. In this example, the power transmitter 92 is provided on a bottom part of a mounting part 91. Thus, in the state in which a lens barrel 3 directs upward and an optical axis 20 is perpendicular to the ground surface, the power receiver 66 is in proximity to the power transmitter 92. That is, the drive controller 62 moves the camera body 2 such that the lens barrel 3 directs upward and that the optical axis 20 is perpendicular to the ground surface.

Charging is performed with the camera body 2 being maintained in the power supply attitude. A process (step S207) for determining whether or not charging is completed is the same as that of the first embodiment.

<3. Advantages>

Thus, the imaging apparatus 300 includes an outer shell 1, the camera body 2 arranged inside the outer shell 1 and moving along the outer shell 1, the first to third drivers 26A-26C arranged inside the outer shell 1 and configured to drive the camera body 2, the drive controller 62 configured to control the first to third drivers 26A-26C, a power source 65 arranged inside the outer shell 1 and configured to supply power to the first to third drivers 26A-26C, the power receiver 66 arranged inside the outer shell 1 so as to move together with the camera body 2 and configured to receive power from the outside of the outer shell 1 to supply the power to the power source 65, and a power supply detector 67 configured to determine, based on the power received by the power receiver 66, whether or not the power is supplied from the outside of the outer shell 1. When the power supply detector 67 determines that the power is supplied, the drive controller 62 controls the first to third drivers 26A-26C to move the camera body 2 to the predetermined power supply position.

The imaging apparatus 300 further includes the acceleration sensor 64b configured to detect the attitude of the camera body 2. The drive controller 62 controls the first to third drivers 26A-26C based on a detection result of the acceleration sensor 64b to move the camera body 2 to a predetermined power supply position.

The power supply position is a position where the camera body 2 faces the power receiver 66 and the power transmitter 92.

<<Other Embodiment>>

As described above, the foregoing embodiment has been described as example techniques disclosed in the present application. However, the techniques according to the present disclosure are not limited to the foregoing embodiment, but are also applicable to those where modifications, substitutions, additions, and omissions are made. In addition, elements described in the foregoing embodiment may be combined to provide a different embodiment. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential.

For the foregoing embodiments, the following configurations may be employed.

For example, in the first to third embodiments, the imaging apparatuses 100-300 have been described as examples of the drive apparatus, and the camera body 2 has been described as an example of the movable body. However, the present disclosure is not limited to such examples. As long as the drive apparatus includes the movable body moving inside the case by the electrically-operated driver, any apparatuses may be employed.

The imaging apparatus 100 shoots still images and moving pictures. However, the imaging apparatus 100 may shoot only still images or moving pictures.

The configuration of the outer shell 1 is not limited to the foregoing embodiments. For example, the outer shell 1 may be divided into two parts or four or more parts. Moreover, as long as the camera body 2 is arranged inside the outer shell 1 and moves along the outer shell 1, the outer shell 1 may have an outer surface in any shapes. In addition, the outer shell 1 does not necessarily have a complete spherical inner surface, and may have a spherical inner surface at least in a region contacting the driver.

The first to third drivers 26A-26C are vibration actuators each including a piezoelectric device, but are not limited to such actuators. For example, the driver may include a stepping motor and a drive wheel, and may be configured such that the drive wheel contacts the inner surface of the outer shell 1.

The number and arrangement of the drivers 26A-26C may be arbitrarily set. The number of drivers is not limited to three, and may be two or less or four or more.

As described above, the technique disclosed herein is useful for the drive apparatus including the movable body arranged inside the case.

What is claimed is:

1. A drive apparatus, comprising:
   a case;
   a movable body arranged inside the case and moving along an inner surface the case;
   a driver arranged inside the case and configured to drive the movable body;
   a controller configured to control the driver;
   a power source arranged inside the case and configured to supply power to the driver;
   a power receiver arranged inside the case so as to move together with the movable body and configured to receive power from an outside of the case to supply the power to the power source; and
   a determinator configured to determine, based on the power received by the power receiver, whether or not the power is supplied from the outside of the case, wherein, when the determinator determines that the power is supplied, the controller controls the driver to move the movable body and the power receiver to a predetermined power receiving position.

2. The drive apparatus of claim 1, wherein the power receiving position is a position where the power received by the power receiver is equal to or greater than a predetermined threshold value.

3. The drive apparatus of claim 1, further comprising:
a power transmitter position detector configured to detect a position of a power transmitter configured to perform non-contact power supply from the outside of the case to the power receiver,
wherein the controller controls the driver based on a detection result of the power transmitter position detector to move the movable body to the power receiving position.

4. The drive apparatus of claim 1, further comprising:
an attitude detector configured to detect an attitude of the movable body,
wherein the controller moves, based on a detection result of the attitude detector, the movable body to the power receiving position.

5. The drive apparatus of claim 1, wherein the power receiver receives power in a non-contact state.

6. The drive apparatus of claim 1, wherein the determinator determines that the power is supplied from the outside of the case when the power received by the power receiver is equal to or greater than a first threshold value.

7. The drive apparatus of claim 6, wherein the controller controls the driver to stop the movable body and the power receiver when the determinator determines that the power received by the power receiver is equal to or greater than a second threshold value that is greater than the first threshold value.

8. The drive apparatus of claim 6, wherein the controller controls the driver to move the movable body and the power receiver along a predetermined path when the determinator determines that the power received by the power receiver is equal to or greater than the first threshold value.

9. The drive apparatus of claim 6, wherein the controller controls the driver to move the movable body and the power receiver in a plurality of directions when the determinator determines that the power received by the power receiver is equal to or greater than the first threshold value.

10. The drive apparatus of claim 1, wherein the controller controls the driver to move the movable body to search for the power receiving position.

11. The drive apparatus of claim 1, further comprising a strap that is attached to an outside of the case.

12. The drive apparatus of claim 5, wherein:
the power receiver defines a first plane, and
when the determinator determines that the power is supplied, the controller controls the driver to move the power receiver so that the first plane is substantially parallel to the horizontal plane.

13. The drive apparatus of claim 5, wherein, when the determinator determines that the power is supplied, the controller controls the driver to move the power receiver along a shape of inside of the case in a direction of gravitational force.

14. A system, comprising:
a first case;
a power transmitter arranged inside the first case and configured to transmit power;
a second case;
a movable body arranged inside the second case and moving along an inner surface of the second case;
a driver arranged inside the second case and configured to drive the movable body;
a controller configured to control the driver;
a power source arranged inside the second case and configured to supply power to the driver;
a power receiver arranged inside the second case so as to move together with the movable body and configured to receive power from the power transmitter to supply the power to the power source; and
a determinator configured to determine, based on the power received by the power receiver, whether or not the power is supplied from the power transmitter in the first case,
wherein, when the determinator determines that the power is supplied from the power transmitter, the controller controls the driver to move the movable body and the power receiver to a predetermined power receiving position.

15. The drive apparatus of claim 14, wherein the power receiver, at the predetermined power receiving position, is positioned between the movable body and the power transmitter.

16. The drive apparatus of claim 15, wherein:
the power receiver defines a first plane and the power transmitter defines a second plane, and
the first plane is substantially parallel to the second plane when the power receiver is positioned at the predetermined power receiving position.

17. The drive apparatus of claim 16, wherein the second plane is substantially parallel to the horizontal plane.

* * * * *